Figure 1:
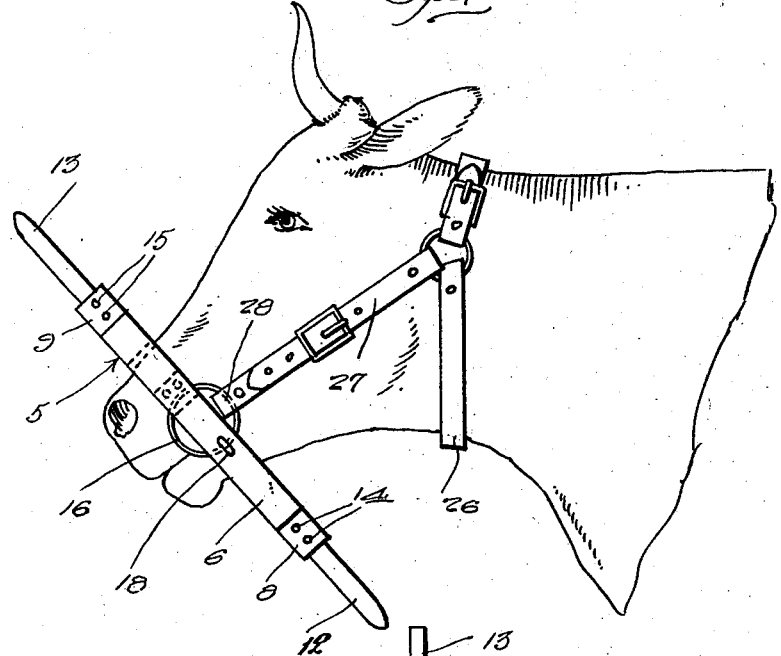

June 24, 1930.  R. W. HARTER  1,767,284
CATTLE POKE
Filed Aug. 30, 1929

Inventor
Ralph W. Harter

By Clarence A. O'Brien
Attorney

Patented June 24, 1930

1,767,284

UNITED STATES PATENT OFFICE

RALPH W. HARTER, OF DE WITT, MICHIGAN

CATTLE POKE

Application filed August 30, 1929. Serial No. 389,505.

This invention relates to cattle pokes, and an object of the invention is to provide a cattle poke to be placed upon the head of cattle to prevent them from forcing their heads through fences, and other restricted places while they are grazing in a field.

Further objects of the invention are to provide in a manner as hereinafter set forth, a device of the character referred to, which is strong, compact and durable, very simple in its method of assembly, highly efficient for its intended purpose, and comparatively inexpensive to manufacture and install.

With the foregoing and other objects in view, the invention consists in the novel construction, combination and arrangement of parts as will be hereinafter more specifically described and illustrated in the accompanying drawings, wherein is disclosed an embodiment of the invention, but it is to be understood that changes, variations and modifications may be resorted to without departing from the spirit of the claims hereto appended.

Figure 2:
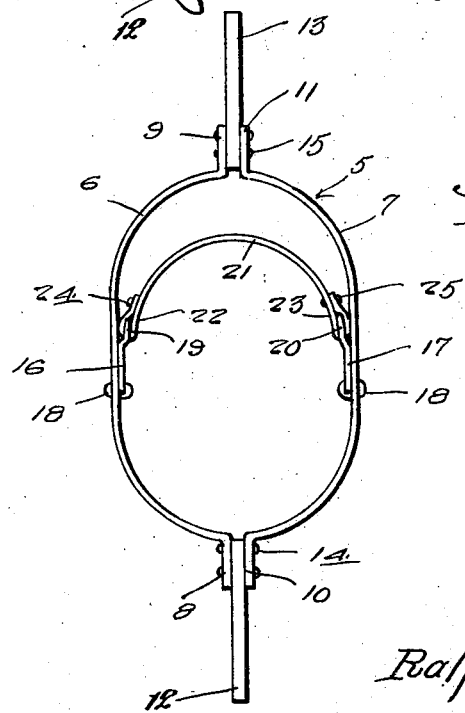

In the drawings wherein like reference characters denote corresponding parts throughout the several views:

Figure 1 shows the head of a cow illustrating an application of the present invention therewith, and Figure 2 is an outer end view of the device.

Referring to the drawings in detail, 5 indicates generally an oval yoke member formed of metallic straps 6, 7, which are semi-oval in configuration. The straps 6, 7 are complementary to each other. The opposite ends of the strap 6 are formed with a pair of arms 8, 9 that project outwardly. The strap 7 is formed with a pair of outwardly projecting arms 10, 11. A pair of straight prongs 12, 13 have the inner ends thereof anchored between the confronting arms of the straps, the prong 12 being secured between arms 8 and 10 by means of hold fast devices 14. The upper prong 13 has its inner end secured between the arms 9 and 11 by holdfast devices 15.

The prongs 12 and 13 project outwardly from the yoke 5 along the major axis thereof. A pair of rings 16, 17 are secured on the opposite sides of the yoke 5 by staples 18. The rings 16, 17 are disposed at the minor axis of the yoke. Segmental portions 19, 20 of the rings are inset with respect to the plane of the rings. An arcuate pliable strap 21 is disposed across the minor axis of the yoke and the opposite ends thereof 22, 23, overlap the inset portions of the ring 19, 20, and are secured by the rivets 24, 25.

The pliable strap 21 may be formed of leather, fabric or other soft materials. A neck strap 26 is adapted to be detachably circumposed about the neck of the cattle and has the inner end of a pair of adjustable straps 27 attached thereto. Straps 27 have the forward ends thereof attached to the rings 16, 17 as at 28. The straps extend on the opposite sides of the face of the animal so as to support the yokes over the mouth and nose of the animal.

It is to be understood that by describing in detail herein any particular form, structure or arrangement it is not intended to limit the invention beyond the terms of the several claims, or the requirements of the prior art.

Having described my invention, what I claim is:

1. A cattle poke of the class described comprising an oval metallic yoke adapted to be circumposed about the nose and mouth of the animal, a pair of straight prongs projecting from the yoke in opposite directions along the major axis of the yoke, a pair of rings secured to the opposite sides of the yoke, a pliable arcuate support secured at its opposite ends to the rings and bridging the minor axis of the yoke, a neck band for disposition about the neck of the animal and a pair of adjustable straps secured at one end to the band and at their other ends to the rings for holding the yoke on the animal.

2. A cattle poke of the class described comprising an oval metallic yoke adapted to be circumposed about the nose and mouth of the animal, a pair of straight prongs projecting from the yoke in opposite directions along the major axis of the yoke, a pair of rings secured to the opposite sides of the yoke, a pliable arcuate support secured at its opposite ends to the rings and bridging the minor axis of the yoke, a neck band for disposition about the neck of the animal and a pair of adjustable straps secured at one end to the band and at their other ends to the rings for holding the yoke on the animal, said rings having a segmental portion inset to receive the ends of the straps.

3. A cattle poke of the class described comprising an oval metallic yoke adapted to be circumposed about the nose and mouth of the animal, a pair of straight prongs projecting from the yoke in opposite directions along the major axis of the yoke, a pair of rings secured to the opposite sides of the yoke, a pliable arcuate support secured at its opposite ends to the rings and bridging the minor axis of the yoke, a neck band for disposition about the neck of the animal and a pair of adjustable straps secured at one end to the band and at their other ends to the rings for holding the yoke on the animal, said rings having a segmental portion inset, and said yoke including a pair of complementary semi-oval sections having radially projecting arms on the ends of each and said inner ends of the prongs secured between the arms at each end thereof.

In testimony whereof I affix my signature.

RALPH W. HARTER.